US009405673B2

(12) United States Patent
Yi et al.

(10) Patent No.: US 9,405,673 B2
(45) Date of Patent: Aug. 2, 2016

(54) MEMORY CONTROLLER, AND ELECTRONIC DEVICE HAVING THE SAME AND METHOD FOR OPERATING THE SAME

(71) Applicants: Jong-Won Yi, Suwon-Si (KR); Jeong-Wook Moon, Hwaseong-Si (KR)

(72) Inventors: Jong-Won Yi, Suwon-Si (KR); Jeong-Wook Moon, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 14/016,167

(22) Filed: Sep. 2, 2013

(65) Prior Publication Data

US 2014/0068161 A1 Mar. 6, 2014

(30) Foreign Application Priority Data

Sep. 3, 2012 (KR) ........................ 10-2012-0097254

(51) Int. Cl.
*G06F 13/00* (2006.01)
*G06F 12/02* (2006.01)
*G06F 9/00* (2006.01)

(52) U.S. Cl.
CPC .... *G06F 12/0246* (2013.01); *G06F 2212/7201* (2013.01)

(58) Field of Classification Search
CPC .................................. G06F 13/00; G06F 9/00
USPC ............................... 711/104, 167–168; 710/5
See application file for complete search history.

(56) References Cited

U.S. PATENT DOCUMENTS

| 5,822,251 | A  | * | 10/1998 | Bruce et al. | 365/185.33 |
|-----------|----|---|---------|--------------|------------|
| 6,182,189 | B1 | * | 1/2001  | Alexis et al. | 711/103 |
| 6,553,454 | B1 | * | 4/2003  | Harada | 711/111 |
| 7,290,109 | B2 | * | 10/2007 | Horii et al. | 711/168 |
| 7,577,059 | B2 |   | 8/2009  | Pyeon |  |
| 7,644,224 | B2 |   | 1/2010  | Murin et al. |  |
| 7,752,411 | B2 | * | 7/2010  | Osborne et al. | 711/168 |
| 7,966,469 | B2 | * | 6/2011  | Skerlj et al. | 711/168 |
| 8,050,131 | B2 |   | 11/2011 | Lee |  |
| 8,543,756 | B2 | * | 9/2013  | Nguyen et al. | 711/103 |
| 2005/0160216 | A1 | * | 7/2005 | Norman et al. | 711/5 |
| 2006/0149912 | A1 | * | 7/2006 | Ma | 711/169 |
| 2007/0198770 | A1 | * | 8/2007 | Horii et al. | 711/103 |

(Continued)

FOREIGN PATENT DOCUMENTS

KR   10-0463197 A   12/2004
KR   10-0694968 A   3/2007

(Continued)

*Primary Examiner* — Christopher Shin
(74) *Attorney, Agent, or Firm* — Volentine & Whitt, PLLC

(57) ABSTRACT

A memory controller includes a first interface and a microprocessor. The first interface is configured to receive a first command, a first address, an address state separation command, and a second address, the first address corresponding to the first command, and the address state separation command separating the first and second addresses from each other. The microprocessor is configured to decode the first command, map the first address to a non-volatile memory device, execute the first command relative to the first address mapped to the non-volatile memory device, and determine a relation between the first address and the second address. The microprocessor is further configured to selectively execute the second command relative to the second address mapped to the non-volatile memory device concurrently with the first command based on the relation between the first address and the second address.

30 Claims, 8 Drawing Sheets

(56) References Cited

U.S. PATENT DOCUMENTS

| | | |
|---|---|---|
| 2008/0313391 A1* | 12/2008 | Iwanari et al. ................ 711/103 |
| 2009/0003066 A1 | 1/2009 | Park et al. |
| 2010/0058003 A1 | 3/2010 | Goto et al. |
| 2010/0161886 A1 | 6/2010 | Toelkes et al. |
| 2010/0287353 A1 | 11/2010 | Khmelnitsky et al. |
| 2010/0290286 A1 | 11/2010 | Koya et al. |
| 2012/0020155 A1 | 1/2012 | Kim |
| 2015/0095551 A1* | 4/2015 | Confalonieri et al. ........ 711/103 |
| 2015/0106561 A1* | 4/2015 | Ware et al. .................... 711/106 |

FOREIGN PATENT DOCUMENTS

| | | |
|---|---|---|
| KR | 100819102 B1 | 4/2008 |
| KR | 10-0837274 A | 6/2008 |
| WO | 03/073431 A1 | 9/2003 |

* cited by examiner

MEMORY CONTROLLER, AND ELECTRONIC DEVICE HAVING THE SAME AND METHOD FOR OPERATING THE SAME

CROSS-REFERENCE TO RELATED APPLICATION

A claim of priority is made to Korean Patent Application No. 10-2012-0097254 filed on Sep. 3, 2013, in the Korean Intellectual Property Office, and all the benefits accruing therefrom under 35 U.S.C. 119, the contents of which in its entirety are herein incorporated by reference.

BACKGROUND

The present inventive concept relates to a memory controller for controlling a non-volatile memory device, an electronic device having the memory controller and a method for operating the memory controller.

Memory devices are generally categorized as either volatile or non-volatile. Volatile memory devices are characterized by the loss of stored contents upon entry of a power-off state. Examples of volatile memory devices include certain types of random access memory (RAM) such as a static RAM (SRAM), a dynamic RAM (DRAM), a synchronous DRAM (SDRAM), and the like.

In contrast, nonvolatile memory devices are characterized by the retention of stored contents even during a power-off condition. Examples of nonvolatile memory devices include a read only memory (ROM), a programmable ROM (PROM), an electrically programmable ROM (EPROM), an electrically erasable and programmable ROM (EEPROM), a flash memory device, a phase-change RAM (PRAM), a magnetic RAM (MRAM), a resistive RAM (RRAM), a ferroelectric RAM (FRAM), and the like. Among these, the flash memory (which is derived from EEPROM technology), performs memory erase operations on a memory block basis, and program operations on a memory cell basis.

SUMMARY

The present inventive concept, among other things, provides a memory controller for controlling a non-volatile memory, an electronic device having the memory controller, and a method for operating the memory controller. Embodiments of the inventive concept may increase a multi-plane operating speed of the non-volatile memory device by receiving from a host a first address, a second address, and an address state separation command for separating the first address from the second address to determine whether the address state separation command is to be concurrently performed in the first address and the second address.

According to an aspect of the present inventive concept, a memory controller includes a first interface and a microprocessor. The first interface is configured to receive a first command, a first address, an address state separation command, and a second address, the first address corresponding to the first command, and the address state separation command separating the first and second addresses from each other. The microprocessor is configured to decode the first command, map the first address to a non-volatile memory device, execute the first command relative to the first address mapped to the non-volatile memory device, and determine a relation between the first address and the second address. The microprocessor is further configured to selectively execute the second command relative to the second address mapped to the non-volatile memory device concurrently with the first command based on the relation between the first address and the second address.

According to another aspect of the present inventive concept, a memory controller includes a host interface, a memory interface and a microprocessor. The host interface is configured to receive in order a first command, a first address associated with the first command, a separation command, a second address, and a second command associated with the second address. The memory interface is configured to interface with a non-volatile memory. The microprocessor is configured to decode the first command, map the first address to the non-volatile memory, extract the first and second addresses based on the separation command, and determine a relationship between the first and second addresses, where the relationship is indicative of whether the first and second commands can be concurrently executed. The microprocessor is further configured to concurrently execute the first and second commands when the relationship indicates that the first and second commands can be concurrently executed, and to non-concurrently execute the first and second commands when the relationship does not indicate that the first and second commands can be concurrently executed.

According to still another aspect of the present inventive concept, an electronic device includes a host, and a memory controller communicating with the host and controlling one or more non-volatile memory devices. The memory controller includes a host interface, a microprocessor and a memory interface. The host interface is coupled to the host and is configured to receive a first command, a first address, a second address, and an address state separation command for separating the first and second addresses from each other. The microprocessor configured to decode the first command, map the first address to the one or more non-volatile memory devices, and determine a relation between the first address and the second address. The memory interface is configured to provide the decoded first command and the mapped first address to the one or more non-volatile memory devices.

According to still another aspect of the present inventive concept, a method for operating a memory controller includes receiving from a host a first program command, a first address, a second address, and an address state separation command for separating the first and second addresses from each other. The method further includes receiving the second address and data corresponding to the program command in that order, controlling a non-volatile memory device to perform the first program command in the first address, and receiving a second program command corresponding to the second address and second and third addresses and controlling the non-volatile memory device non-volatile memory device to perform the second command in the second address.

According to still another aspect of the present inventive concept, a memory controller includes a first interface receiving a first command, a first address and a second address and then receiving a second command and a third address from a host, and a microprocessor performing a first operation using the first command and the first address and performing a second operation using the second command and the second address.

As described above, according to the inventive concept of the present inventive concept, the memory controller receives an address separation command from a host of a non-volatile memory device and determines whether a plurality of planes can be concurrently performed, thereby increasing the multi-plane operating speed of the non-volatile memory device.

BRIEF DESCRIPTION OF THE DRAWINGS

The above and other features and aspects of the present inventive concept will become readily apparent from the detailed description that follows, with reference to the accompanying drawings, in which.

DETAILED DESCRIPTION OF THE EMBODIMENTS

Aspects and features of the present inventive concept and methods of accomplishing the same will now be described by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. Thus, in some embodiments, well-known methods, procedures, components, and circuitry have not been described in detail to avoid unnecessarily obscuring aspects of the present inventive concept.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular embodiments only and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "comprising," when used in this specification, specify the presence of the stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an electronic device including a non-volatile memory system according to an embodiment of the present inventive concept will now be described with reference to the block diagram of FIG. 1.

Figure 1:
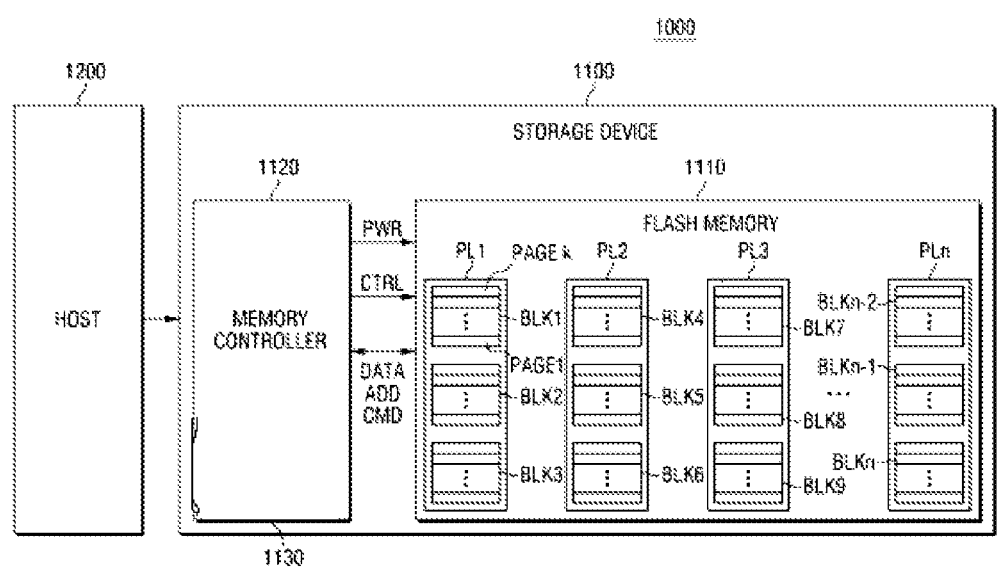
FIG. 1 is a block diagram of an electronic device including a non-volatile memory system according to an embodiment of the present inventive concept.

Referring to FIG. 1, the electronic device 1000 includes a host 1200 and a non-volatile memory system 1100.

The host 1200 may be any of a large variety of electronic devices, examples of which include a personal computer, a digital camera, a camcorder, a cellular phone, a smart phone, a portable device, an MP3 player, a portable media player (PMP), a PlayStation Portable (PSP) player, a personal digital assistant (PDA), and an e-mail transceiving device.

The non-volatile memory system 1100 includes a memory controller 1120 and a non-volatile memory device 1110. The memory controller 1120 generally controls operations of the non-volatile memory device 1110. That is to say, the non-volatile memory device 1100 executes erase, write or read operations under control of the memory controller 1120.

Still referring to FIG. 1, the non-volatile memory device 1100 receives a command (CMD), an address (ADD), and data (DATA) through one or more input/output (I/O) lines (or channels) between the non-volatile memory device 1100 and the memory controller 1120. In addition, in the example of this embodiment, the non-volatile memory device 1100 receives power (PWR) through a power line from the memory controller 1120, and a control signal (CTRL) through a control line from the memory controller 1120. The control signal CTRL may include, for example, a command latch enable (CLE) signal, an address latch enable (ALE) signal, a chip enable (nCE) signal, a write enable (nWE) signal, a read enable (nRE) signal, and so on.

The non-volatile memory device 1100 may includes one or more different types of non-volatile memory, such as flash memory, electrically erasable programmable read-only memory (EEPROM), ferroelectrics random access memory (FRAM), phase change random access memory (PRAM), magnetoresistive random access memory (MRAM), and so on. The embodiment of FIG. 1 adopts NAND flash memory as the non-volatile memory thereof. However, NAND flash memory is considered as an example only, and the present inventive concept are not limited thereto.

The non-volatile memory device 1100 may serve as a storage unit storing data received from the memory controller 1120. The non-volatile memory device 1100 may include a plurality of cell arrays each storing data. The cell arrays may include a plurality of planes (PL1-PLn), where n is a natural number. The planes PL1 to PLn collectively include a plurality of blocks BLK1 to BLKm, where m is a natural number. The blocks BLK1 to BLKm each include a plurality of pages PAGE1 to PAGEk, where k is a natural number. Each of the blocks BLK1 to BLKm constitutes an erase unit that is erased in response to an erase command. That is to say, erase operations are performed on a block basis. The pages PAGE1 to PAGEk are units for performing program and read commands. That is to say, the program and read operations may be concurrently performed with respect to each page.

Meanwhile, according to embodiments, the memory controller 1120 includes a host interface (not shown) is connected to the host 1200 and the non-volatile memory system 1100. As will be described in more detail later herein, the memory controller 1120 receives from the host 1200 a first command, a first address corresponding to the first command, a second address, an address state separation command for separating the first and second addresses from each other, and a second command corresponding to the second address. In addition, the memory controller 1120 determines whether the first command and the second command may be concurrently performed at the first address and the second address.

Figure 2:
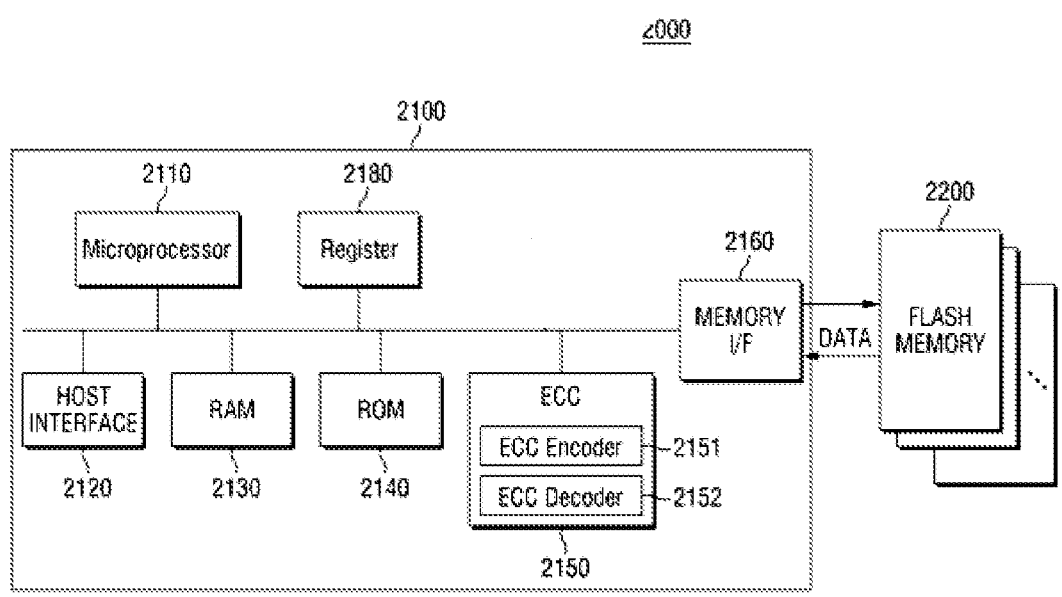
FIG. 2 is a block diagram of a memory system according to another embodiment of the present inventive concept.

FIG. 2 is a block diagram of a memory system (2000) according to another embodiment of the present inventive concept.

Referring to FIG. 2, the memory system 2000 includes non-volatile memory devices 2200 and a memory controller 2100.

The non-volatile memory devices 2200 may serve as a storage unit storing data received from the memory controller 2100. Each of the non-volatile memory devices 2200 may be a flash memory, as shown in FIG. 2, and in the example of this embodiment the flash memory is NAND flash memory. Each non-volatile memory device 2200 may be configured similarly to the flash memory 1110 described above in connection with FIG. 1. Again, however, like the embodiment of FIG. 1, the embodiment of FIG. 2 is not limited to NAND flash memory, and other non-volatile memory be adopted such as electrically erasable programmable read-only memory (EEPROM), ferroelectric random access memory (FRAM), phase change random access memory (PRAM), magnetoresistive random access memory (MRAM), and so on.

The controller 2100 may include a microprocessor 2110, a random access memory (RAM) 2130, a read only memory (ROM) 2140, an error correction code (ECC) unit 2150, a host interface 2120, a memory interface (I/F) 2160, and a register 2180. These components of the controller 2100 may be electrically interconnected through a bus.

The host interface 2120 may perform interfacing between the memory system 2000 including the controller 2100 and a host.

As will be described in more detail later herein, according to an embodiment of the inventive concept, the host interface 2120 receives from the host a first command, a first address corresponding to the first command, a second address, an address state separation command for separating the first and second addresses from each other, and a second command corresponding to the second address. According to embodiments, after receiving the second address, the host interface 2120 may receive the second command corresponding to the second address and may then receive a third address. The third address is an address consecutively provided after the second address and does not correspond to the first command or the second command. For example, the host interface 2120 may provide a logical address, a command latch enable (CLE) signal, an address latch enable (ALE) signal, a ready/busy (R/B) signal, and a chip enable (CE) signal from the host to the controller. In addition, the host interface 2120 may communicate with the host according to a predetermined protocol. For example, the predetermined protocol may include Universal Serial Bus (USB), Small Computer System Interface (SCSI), PCI express, ATA, Parallel ATA (PATA), Serial ATA (SATA), and Serial Attached SCSI (SAS), but aspects of the present inventive concept are not limited thereto.

The ROM 2140 may store driving firmware codes of the memory system 2000, but aspects of the present inventive concept are not limited thereto. The firmware codes may be stored in various types of non-volatile memory devices other than the ROM 2140, including, for example, a NAND flash memory. Therefore, control or intervention of the microprocessor 2110 may include direct control of the microprocessor 2110 in a hardware manner and intervention of firmware that is software driven by the microprocessor 2110.

The RAM 2130 is a memory serving as a buffer and may store the first and second commands input through the host interface 2120, the first and second addresses, the address state separation command for separating the first and second addresses from each other, various variables, and/or data output from the non-volatile memory device 2100. In addition, the RAM 2130 may store data, various parameters and variables, input to/output from the non-volatile memory device 2100.

The microprocessor 2110 can be implemented by circuits, logic gates, software code or combinations thereof, and generally controls the operation of the memory system 2000 including a microcontroller. When power is applied to the memory system 2000, the microprocessor 2110 drives the firmware stored in the ROM 2140 to operate the memory system 2000 on the RAM 2130, thereby controlling the overall operation of the memory system 2000.

In addition, the microprocessor 2110 analyzes commands provided through the host interface 2120 and may control an overall operation of the non-volatile memory device 2200 according to the analyzed commands. For example, referring to FIG. 2, the microprocessor 2110 decodes a first command provided through the host interface 2120, maps the first address, and controls the decoded first command to be performed in a non-volatile memory using the mapped first address. In addition, the microprocessor 2110 determines a relation between the second address and the first address. In other words, the microprocessor 2110 may determine whether the first command and the second command may be concurrently performed in the first address and the second address.

In addition, the memory I/F 2160 may exchange signals between the controller 2100 and the non-volatile memory device 2200. A command requested by the microprocessor 2110 may be provided to the non-volatile memory device 2200 through the memory I/F 2160. In addition, data may be transmitted from the controller 2100 to the non-volatile memory device 2200. The data output from the non-volatile memory device 2100 is provided to the controller 2100 through the memory interface 2160.

In addition, the microprocessor 2110 maps parameters provided from the host to be optimized to the non-volatile memory device 2200 using a first command and parameters stored in the RAM 2130. For example, when the first command provided from the host is a read command, the microprocessor 2110 may map the first command to a second command to be provided through the memory I/F 2160, that is, a memory read command or a memory erase command.

The register 2180 may store the first command, the first and second addresses, the address state separation command for separating the first and second addresses from each other, and the second command, which are input through the host interface 2120. In addition, the register 2180 may store first and second decoded commands and first and second mapped addresses under the control of the microprocessor 2110. In addition, the register 2180 may store a second address obtained by decoding the first address or logical address under the control of the microprocessor 2110. The register 2180 may be positioned within the microprocessor 2110 according to embodiments. Alternatively, a separately provided register 2180 may be electrically connected to the other components of the controller 2000.

According to embodiments, the first command may be a read command or an erase command. Alternatively, according to embodiments, the first command may be a program command. When the first command is a program command, the host interface 2120 may sequentially receive the first command, the second address and first data to be programmed in that order. In addition, when the first program command is performed, information concerning the second address is programmed in a metadata region of the first address and a program operation termination address may be traced in a sudden power off state. Therefore, data loss due to the sudden power off state can be minimized.

The ECC unit 2150 performs error bit correction. Referring to FIG. 2, the ECC unit 2150 includes an ECC encoder 2151 and an ECC decoder 2152.

The ECC encoder 2151 ECC encodes the data input through the host interface 2120 of the memory system 2000 and generates a codeword with a parity bit added thereto. The cordword may be stored in the non-volatile memory device 2200.

The ECC decoder 2152 performs ECC decoding on the data, determines whether the ECC decoding is successful or not according to the ECC decoding performing result, and outputs an instruction signal according to the determination result. The read data is transmitted to the ECC decoder 2152, and the ECC decoder 2152 may correct an error bit of the data using the parity bit. If the number of error bits generated is greater than or equal to the critical number of correctable error bits, the ECC decoder 2152 cannot correct error bits, resulting in an error correction fail.

The ECC encoder 2151 and the ECC decoder 2152 may perform error correction on a low density parity check (LDPC) code, a BCH code, a turbo code, a Reed-Solomon code, a convolution code, or a recursive systematic code (RSC) using coded modulation such as trellis-coded modulation (TCM) or block coded modulation (BCM), but aspects of the present inventive concept are not limited thereto.

The ECC encoder 2151 and the ECC decoder 2152 may include all of circuits, systems or devices for error correction.

Figure 3:
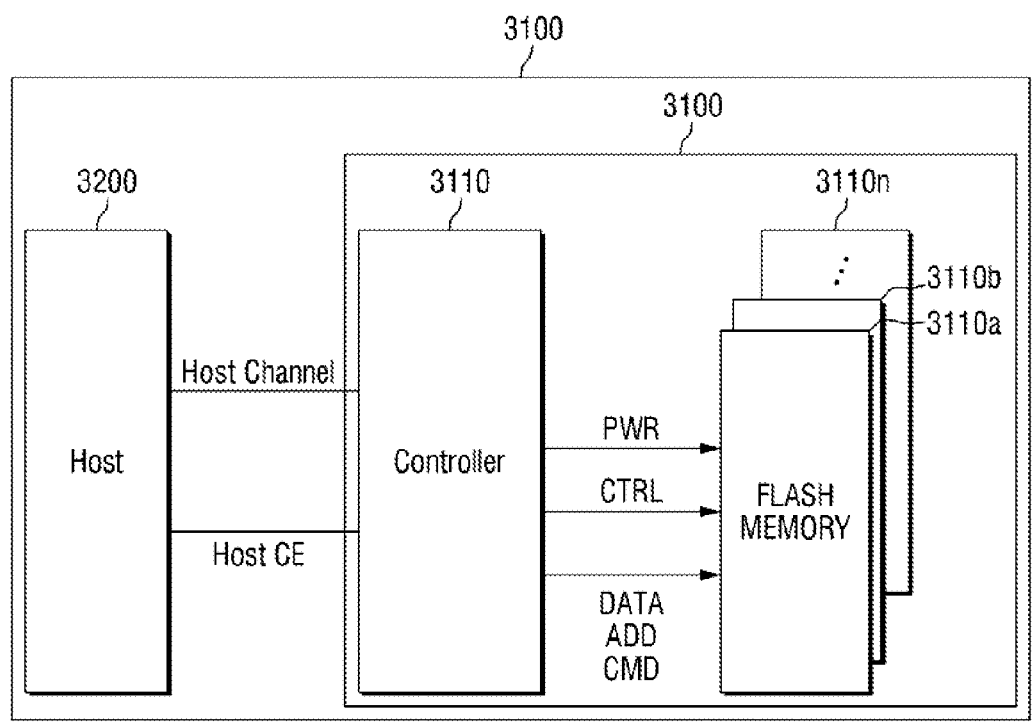
FIG. 3 is a block diagram of an electronic device including a non-volatile memory system according to still another embodiment of the present inventive concept.

FIG. 3 is a block diagram of an electronic device (3000) including a non-volatile memory system (3100) according to still another embodiment of the present inventive concept.

Referring to FIG. 3, the electronic device 3000 including the non-volatile memory system 3100 may be used for a wide variety of devices incorporating a non-volatile memory device 3110 including, for example, a mobile phone, a digital camera, a portable music player, electronic toys, an email transfer device, and so on. A host 3200 includes a host processor, and the host 3200 and the non-volatile memory system 3100 communicate information, such as initial operation command (e.g., a first command), logical addresses, input/output data, or the like, with each other through a host channel. In addition, the host 3200 may provide a chip enable (CE) signal, logical addresses, or a ready/busy (R/B) signal to the non-volatile memory system 3100.

Referring to FIG. 3, the memory system 3100 includes a plurality of non-volatile memory devices 3110a to 3110n and a memory controller 3110. For the sake of convenient explanation, NAND flash memories are shown as the non-volatile memory devices 3110a to 3110n, but aspects of the present inventive concept are not limited thereto. The memory controller 3110 receives a first command, a first address, a second address and an address state separation command provided between the first address and the second address from the host 3200.

The host interface 2120 may receive the address state separation command between the first address and the second address from the host 3200. In addition, according to embodiments, after receiving the second address, the host interface 2120 may receive a second command corresponding to the second address and then receive a third address. The third address is an address arranged consecutive to the second address and does not correspond to the first command or the second command. The microprocessor 2110 decodes the first command provided through the host interface 2120, maps the first address, and controls the decoded first command to be performed in a non-volatile memory using the mapped first address. In addition, the microprocessor 2110 determines a relation between the second address and the first address. In other words, the microprocessor 2110 may determine whether the first command and the second command are to be concurrently performed in the first address and the second address.

Figure 4:
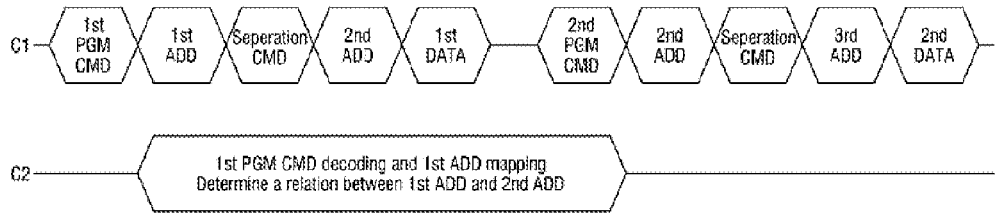
FIG. 4 illustrates a sequence of transmitting commands and addresses provided from a host to a memory controller.

FIG. 4 illustrates a sequence of transmitting commands and addresses provided from a host to a memory controller.

Referring to FIG. 4, at stage C1, commands for performing a program operation and addresses are received from a host.

Referring to FIG. 4, at stages C1 and C2, a host interface that is a first interface receives from the host a sequence including a first command ($1^{st}$ PGM CMD), a first address ($1^{st}$ ADD), address state separation command (Separation CMD), a second address ($2^{nd}$ ADD), and first data ($1^{st}$ DATA). Here, the first address and second address are linked with the address state separation command interposed there between. The address state separation command is a command or code recognizable by the memory controller to separate the first address ($1^{st}$ ADD) and second address ($2^{nd}$ ADD).

Specifically, at stage C1, the address state separation command providing information by which the first and second addresses are separated from each other is provided between the first address and the second address. At stage C1, the first command received from the host corresponds to the first address.

Referring to FIG. 4, the first command is a program command, and after receiving the second address, the host interface receives first data corresponding to the first command and to be programmed. In addition, the host interface receives a second command corresponding to the second address, the second address, the address state separation command, and a third address.

At stage C2 of FIG. 4, the controller decodes the first command under the control of the microprocessor and maps the first address to a block and page address of a non-volatile memory device, thereby controlling the first command to be performed in the non-volatile memory device. In addition, the controller controls the second address to be programmed in a metadata region or a spare page when the first command is performed in a non-volatile memory device. The second address is an address consecutively provided after the first address, and traces a page address in which a program operation is performed when the power is off when an electronic device undergoes a sudden power off phenomenon, thereby minimizing data loss due to the sudden power off phenomenon.

At stage C2 of FIG. 4, the microprocessor determines a relation between the second address and the first address by referring to the address state separation command. In addition, after receiving the second address, the first interface receives a second command corresponding to the second address. The second command is a program command. The relation between the first address and the second address is used to determine whether the first command and the second command are to be concurrently performed in the first address and the second address. Therefore, the microprocessor performs the first command after receiving the second command by referring to the determination result of the relation between the first address and the second address, and thereby the microprocessor may control the first command and the second command to be concurrently performed in the first address and the second address.

At stage C1 of FIG. 4, after receiving the second command, the host interface receives the second address and the third address. After receiving the third address, the host interface receives second data corresponding to the second command and to be programmed. The third address is an address consecutively provided after the second address and does not correspond to the first command or the second command.

Figure 5:
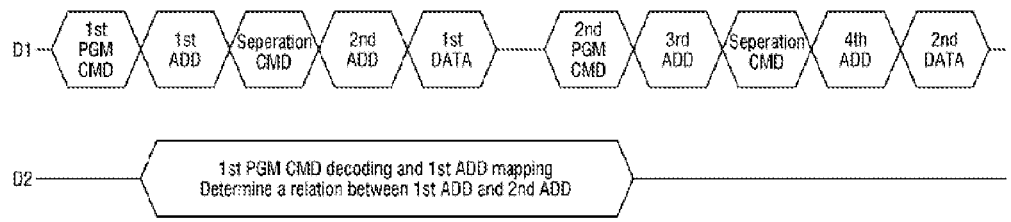
FIG. 5 illustrates a sequence of transmitting commands and addresses provided from a host to a memory controller and a non-volatile memory system according to still another embodiment of the present inventive concept.

FIG. 5 illustrates a sequence of transmitting signals provided from a host to a memory controller and a non-volatile memory system according to still another embodiment of the present inventive concept.

Referring to FIG. 5, at stage D1, commands for performing a program operation and addresses are received from a host.

Referring to FIG. 5, at stages D1 and D2, a host interface that is a first interface receives from the host a first command, a first address, a second address and an address state separation command for separating the first and second addresses from each other.

Specifically, at stage D1, the address state separation command providing information by which the first and second addresses are separated from each other is provided between the first address and the second address. At stage D1, the first command received from the host corresponds to the first address.

Referring to FIG. 5, the first command is a program command, and after receiving the second address, the host interface receives first data corresponding to the first command and to be programmed. In addition, the host interface receives a second command corresponding to the second address, the second address, the address state separation command, and a third address. When the second command is provided, the host interface performs the second command using the second address provided when the first command is received without separately receiving the second address corresponding to the second command.

At stage D2 of FIG. 5, the controller decodes the first command under the control of the microprocessor and maps the first address to a block and page address of a non-volatile memory device, thereby controlling the first command to be performed in the non-volatile memory device. In addition, the controller controls the second address to be programmed in a metadata region or a spare page when the first command is performed in a non-volatile memory device. The second address is an address consecutively provided after the first address, and traces a page address in which a program operation is performed when the power is off when an electronic device undergoes a sudden power off phenomenon, thereby minimizing data loss due to the sudden power off phenomenon.

At stage D2 of FIG. 5, the microprocessor determines a relation between the second address and the first address by referring to the address state separation command. In addition, after receiving the second address, the first interface receives a second command corresponding to the second address. The second command is a program command. The relation between the first address and the second address is used to determine whether the first command and the second command are to be concurrently performed in the first address and the second address. Therefore, after receiving the second command, the microprocessor performs the first command by referring to the determination result of the relation between the first address and the second address, thereby controlling the first command and the second command to be concurrently performed in the first address and the second address.

At stage D1 of FIG. 5, after receiving the second command, the host interface receives the second address and the third address. After receiving the third address, the host interface receives second data corresponding to the second command and to be programmed. The third address is an address consecutively provided after the second address and does not correspond to the first command or the second command.

Figure 6:
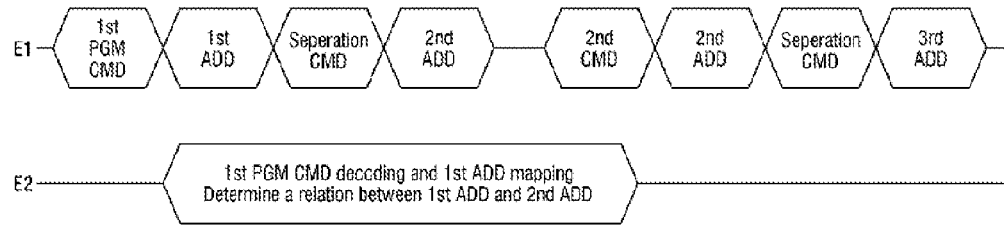
FIG. 6 illustrates a flowchart of transmitting commands and addresses provided from a host to a memory controller and a non-volatile memory system according to still another embodiment of the present inventive concept.

FIG. 6 illustrates a flowchart of transmitting signals provided from a host to a memory controller and a non-volatile memory system according to still another embodiment of the present inventive concept.

Referring to FIG. 6, at stages E1 and E2, the host interface that is a first interface receives from a host a first program command, a first address, a second address, and an address state separation command for separating the first and second addresses from each other.

Specifically, at stage E1, the address state separation command, which is provided between the first address and the second address, provides information by which the first address and the second address can be separated from each other. At stage E1, the first command provided from the host corresponds to the first address.

Referring to FIG. 6, the first command is a read command or an erase command. After receiving the second address, the host interface receives the second command corresponding to the second address, the second address, the address state separation command and the third address. The third address is an address consecutively provided after the second address and does not correspond to the first command or the second command.

When the second command is received, the host interface performs a second command operation using the second address received at the time of receiving the first command without separately receiving the second address corresponding to the second command.

At stage E2 of FIG. 6, the controller decodes the first command under the control of the microprocessor and maps the first address to a block and page address of a non-volatile memory device, thereby controlling the first command to be performed in the non-volatile memory device.

In addition, at stage E2 of FIG. 6, the microprocessor determines a relation between the second address and the first address by referring to the address state separation command. In addition, after receiving the second address, the first interface receives a second command corresponding to the second address.

Referring to FIG. 6, the first or second command may be a read command or an erase command. The relation between the first address and the second address is used to determine whether the first command and the second command are to be concurrently performed in the first address and the second address. Therefore, after receiving the second command, the microprocessor performs the first command by referring to the determination result of the relation between the first address and the second address, thereby controlling the first command and the second command to be concurrently performed in the first address and the second address.

FIG. 6 illustrates a flowchart of transmitting commands and addresses provided from a host to a memory controller and a non-volatile memory system according to still another embodiment of the present inventive concept.

Figure 7:
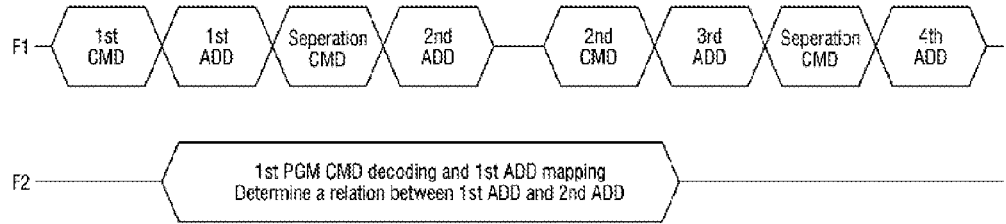
FIG. 7 illustrates a flowchart of transmitting commands and addresses provided from a host to a memory controller and a non-volatile memory system according to still another embodiment of the present inventive concept.

Referring to FIG. 7, at stages F2 and F2, a host interface that is a first interface receives from a host a first command, a first address, a second address and an address state separation command for separating the first and second addresses from each other. Specifically, at stage F2, the address state separation command providing information by which the first and second addresses are separated from each other is provided between the first address and the second address. At stage F2, the first command received from the host corresponds to the first address.

Referring to FIG. 7, the first command is a read command or an erase command, and after receiving the second address, the host interface receives a second command corresponding to the second address, the address state separation command, and a third address.

The third address is an address consecutively provided after the second address and does not correspond to the first command or the second command.

Referring to FIG. 7, when the second command is provided, the host interface performs the second command using the second address provided when the first command is received without separately receiving the second address corresponding to the second command.

At stage F2 of FIG. 7, the controller decodes the first command under the control of the microprocessor and maps the first address to a block and page address of a non-volatile memory device, thereby controlling the first command to be performed in the non-volatile memory device.

In addition, at stage F2 of FIG. 7, the controller determines a relation between the second address and the first address by referring to the address state separation command. In addition, after receiving the second address, the first interface receives a second command corresponding to the second address.

Referring to FIG. 7, the first and second commands may be read or erase commands. The relation between the first address and the second address is used to determine whether the first command and the second command are to be concurrently performed in the first address and the second address. Therefore, after receiving the second command, the microprocessor performs the first command by referring to the determination result of the relation between the first address and the second address, thereby controlling the first command and the second command to be concurrently performed in the first address and the second address.

Figure 8:
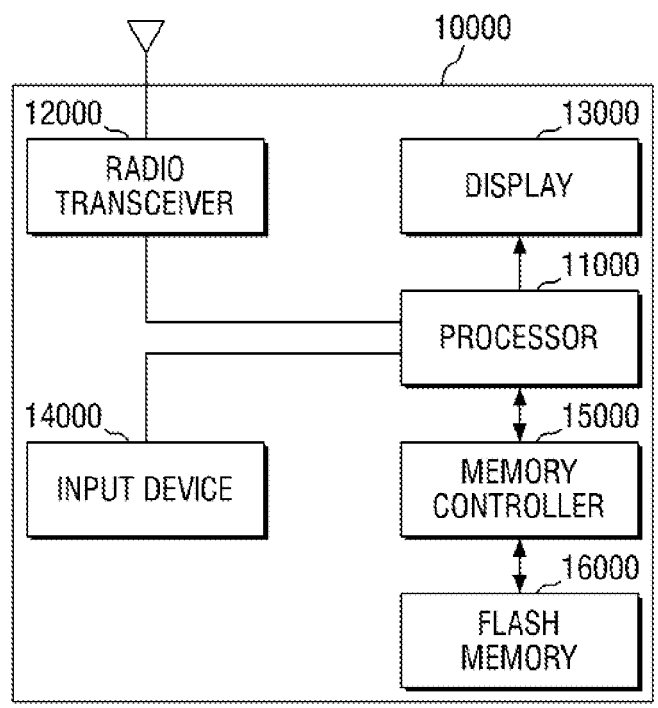
FIG. 8 is a block diagram illustrating an electronic device including a memory controller and a non-volatile memory device according to an embodiment of the present inventive concept.

FIG. 8 is a block diagram illustrating an electronic device (10000) including a memory controller (15000) and a non-volatile memory device (16000) according to an embodiment of the present inventive concept.

Referring to FIG. 8, the electronic device 10000, such as a cellular phone, a smart phone or a tablet PC, may include the non-volatile memory device 16000 implemented as a flash memory, and the memory controller 15000 controlling the operation of the non-volatile memory device 16000.

The non-volatile memory device 16000 may be the same as each of the non-volatile memory devices shown in FIGS. 1 and 2.

The memory controller 15000 is controlled by a processor 11000 controlling the overall operation of the electronic device 10000.

Data stored in the non-volatile memory device 16000 may be displayed on the display 13000 under the control of the memory controller 15000 controlled by the processor 11000.

The memory controller 15000 includes a first interface and a microprocessor. The first interface receives from a host a first command, a first address corresponding to the first command, a second address, an address state separation command for separating the first and second addresses from each other, and a second command corresponding to the second address. The microprocessor decodes the first command, maps the first address, controls the first command to be performed in the non-volatile memory device 16000 using the mapped first address, and determines a relation between the first address and the second address by referring to the address state separation command. The relation between the first address and the second address is used to determine whether the first command and the second command are to be concurrently performed in the first address and the second address.

A radio transceiver 12000 may transmit or receive a radio signal through an antenna (ANT). For example, the radio transceiver 12000 may convert the radio signal received through the antenna ANT into a signal that can be processed by the processor 11000. Therefore, the processor 11000 may process the signal output from the radio transceiver 12000 and may store the processed signal in the non-volatile memory device 16000 through the memory controller 15000 or may display the processed signal through the display 13000.

The radio transceiver 12000 may convert the signal output from the processor 11000 into a radio signal and may output the converted radio signal through the antenna ANT.

An input device 14000 is a device that can input a control signal for controlling the operation of the processor 11000 or data to be processed by the processor 11000 and may be implemented by a pointing device such as a touch pad or a computer mouse, a keypad, or a keyboard.

The processor 11000 may control the display 13000 to display the data output from the non-volatile memory device 16000, the radio signal output from the radio transceiver 12000, or the data provided from the input device 14000 to be displayed on the display 13000.

Figure 9:
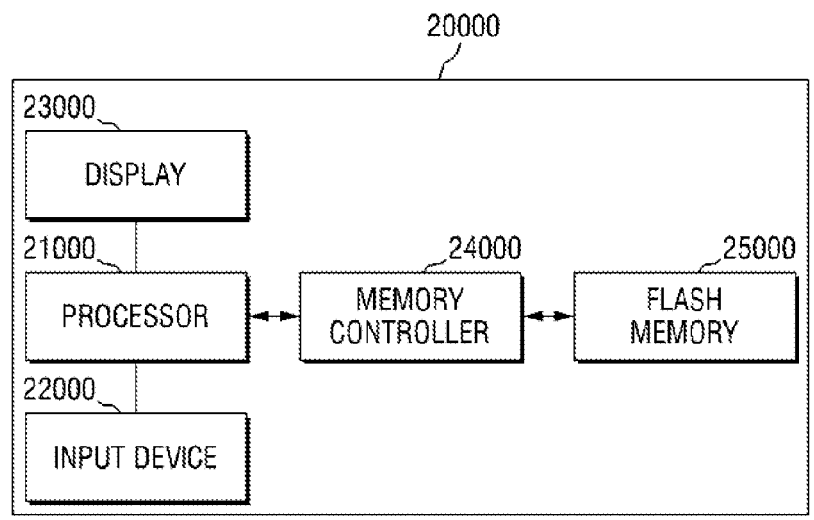
FIG. 9 is a block diagram of an electronic device including a memory controller and a non-volatile memory device according to another embodiment of the present inventive concept.

FIG. 9 is a block diagram of an electronic device (20000) including a memory controller (24000) and a non-volatile memory device (25000) according to another embodiment of the present inventive concept.

Referring to FIG. 9, the electronic device 20000, which can be implemented as a data processing device, such as a personal computer (PC), a tablet computer, a net-book, an e-reader, a personal digital assistant (PDA), a portable multimedia player (PMP), an MP3 player, or an MP4 player, includes the non-volatile memory device 25000 such as a flash memory, and the memory controller 24000 that can control the operation of the non-volatile memory device 25000.

The non-volatile memory device 25000 may be the same as each of the non-volatile memory devices shown in FIGS. 1 and 2.

The electronic device 20000 may include a processor 21000 for controlling the overall operation of the electronic device 20000. The memory controller 24000 is controlled by the processor 21000.

The memory controller 24000 may include a first interface and a microprocessor. The first interface receives from a host a first command, a first address corresponding to the first command, a second address, an address state separation command for separating the first and second addresses from each other, and a second command corresponding to the second address. The microprocessor decodes the first command, maps the first address, controls the decoded first command to be performed in the non-volatile memory device 16000 using the mapped first address, and determines a relation between the first address and the second address by referring to the address state separation command. The relation between the first address and the second address is used to determine whether the first command and the second command are to be concurrently performed in the first address and the second address.

The processor 21000 may display the data stored in the non-volatile memory device on the display according to the input signal generated by an input device 22000. The input device 22000 may be implemented by, for example, a pointing device such as a touch pad or a computer mouse, a keypad, or a keyboard.

Figure 10:
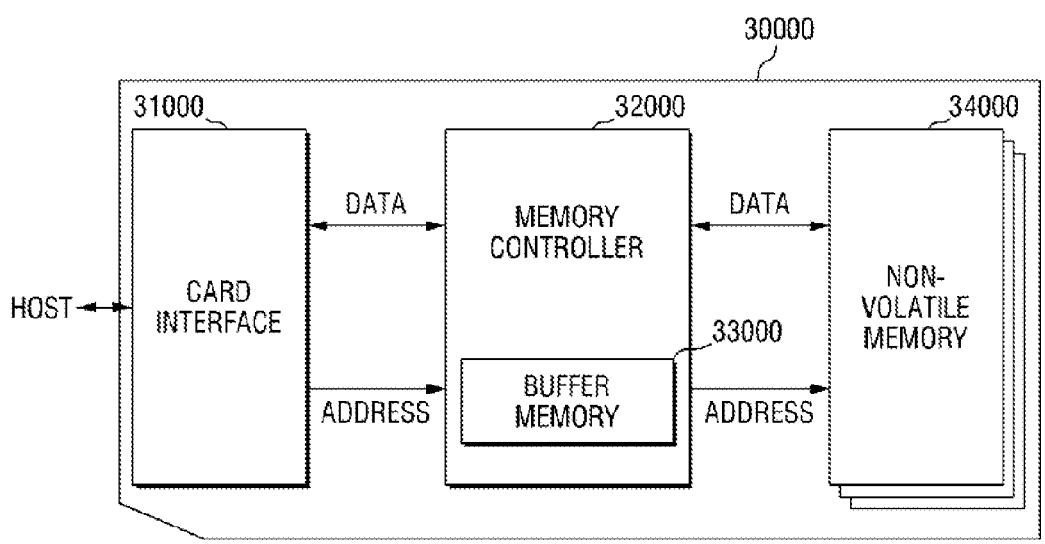
FIG. 10 is a block diagram of an electronic device including a non-volatile memory device according to another embodiment of the present inventive concept.

FIG. 10 is a block diagram of an electronic device (3000) including a non-volatile memory device (34000) according to another embodiment of the present inventive concept.

Referring to FIG. 10, the electronic device 30000 includes a card interface 31000, a memory controller 32000, and a non-volatile memory device 34000, e.g., a flash memory.

The electronic device 30000 may transmit or receive data to/from the host (HOST) through a card interface 31000. According to embodiments, the card interface 31000 may be a secure digital (SD) card interface or a multi-media card (MMC) interface, but aspects of the present inventive concept are not limited thereto. The card interface 31000 may interface data exchange between the host and the memory controller 32000 according to the communication protocol of the host capable of communicating with the electronic device 30000.

The memory controller 32000 may control data exchange between the card interface 31000 and the non-volatile memory device 34000. A buffer memory 33000 of the memory controller 32000 may buffer data exchanged between the card interface 31000 and the non-volatile memory device 34000.

The memory controller 32000 is connected to the card interface 31000 and the non-volatile memory device 34000 through a data bus (DATA) and an address bus (ADDRESS). According to embodiments, the memory controller 32000 may receive an address of data to be read or written from the card interface 31000 through the address bus (ADDRESS) and transmits the received address to the non-volatile memory device 34000.

In addition, the memory controller 32000 receives or transmits data to be read or written through the data bus (DATA) connected to the card interface 31000 or the non-volatile memory device 34000.

The memory controller 32000 may include a first interface and a microprocessor. The first interface receives from a host a first command, a first address corresponding to the first command, a second address, an address state separation command for separating the first and second addresses from each other, and a second command corresponding to the second address. The microprocessor decodes the first command, maps the first address, controls the decoded first command to be performed in the non-volatile memory device 34000 using the mapped first address, and determines a relation between the first address and the second address by referring to the address state separation command. The relation between the first address and the second address is used to determine whether the first command and the second command are to be concurrently performed in the first address and the second address.

The non-volatile memory device 34000 may be the same as each of the non-volatile memory devices shown in FIGS. 1 to 7.

When the electronic device 30000 shown in FIG. 10 is connected to a host (HOST), such as a PC, a tablet PC, a digital camera, a digital audio player, a cellular phone, a console video game hardware, or a digital set-top box, the host (HOST) may exchange data stored in the non-volatile memory device 34000 through the card interface 31000 and the memory controller 32000.

Figure 11:
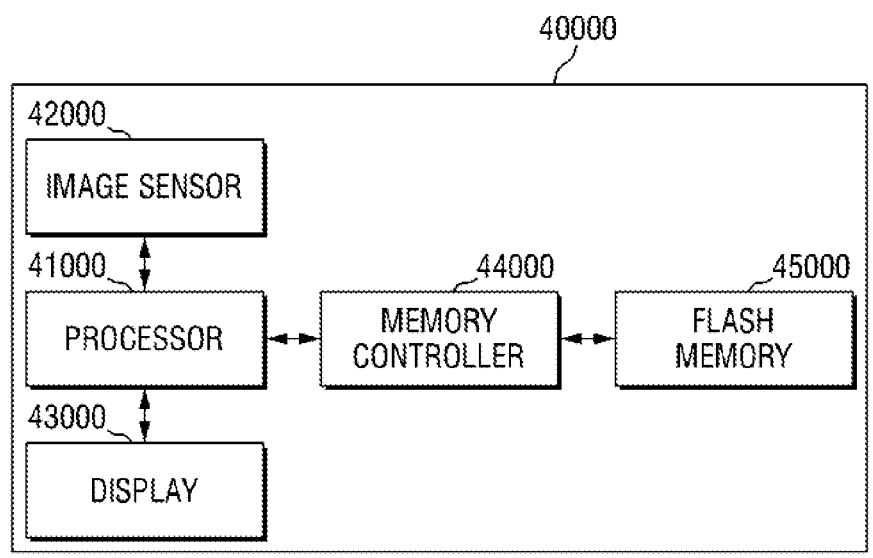
FIG. 11 is a block diagram of an electronic device including a memory controller and a non-volatile memory device according to still another embodiment of the present inventive concept.

FIG. 11 is a block diagram of an electronic device including a memory controller and a non-volatile memory device according to still another embodiment of the present inventive concept.

Referring to FIG. 11, the electronic device 40000 includes a non-volatile memory device 45000, such as a flash memory, a memory controller 44000 for controlling the data processing operation of the non-volatile memory device 45000, and an image sensor 41000 for controlling the overall operation of the electronic device 40000.

The non-volatile memory device 45000 may be the same as each of the non-volatile memory devices shown in FIGS. 1 and 2.

The memory controller 44000 may include a first interface and a microprocessor. The first interface receives from a host 41000 a first command, a first address corresponding to the first command, a second address, an address state separation command for separating the first and second addresses from each other, and a second command corresponding to the second address. The microprocessor decodes the first command, maps the first address, controls the decoded first command to be performed in the non-volatile memory device 45000 using the mapped first address, and determines a relation between the first address and the second address by referring to the address state separation command. The relation between the first address and the second address is used to determine whether the first command and the second command are to be concurrently performed in the first and second addresses.

In addition, the memory controller 44000 may be the same as the memory controller including a seed controller (1260) shown in FIG. 1. The memory controller 44000 may include a first register block for performing a first cyclic shift using a first parameter, a second register block for performing a second cyclic shift using a second parameter, and a seed generator block for forming seeds using the results of the cyclic shifts performed in the first and second register blocks, and may randomize original data into random data using the seeds.

An image sensor 42000 of the electronic device 40000 converts an optical signal into a digital signal, and the converted digital signal is stored in the non-volatile memory device 45000 under the control of the image sensor 42000 or displayed on a display 43000.

Figure 12:
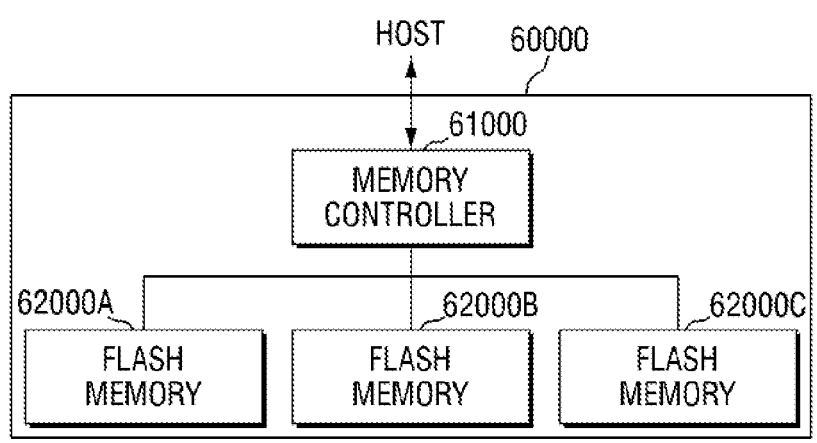
FIG. 12 is a block diagram of an electronic device including a memory controller and non-volatile memory devices according to still another embodiment of the present inventive concept.

FIG. 12 is a block diagram of an electronic device (60000) including a memory controller (61000) and non-volatile memory devices (62000A, 62000B, 62000C) according to still another embodiment of the present inventive concept.

Referring to FIG. 12, the electronic device 60000 may be implemented as a data storage device such as a solid state drive (SSD).

The electronic device 60000 may include a plurality of non-volatile memory devices 62000A, 62000B and 62000C and a memory controller 61000 for controlling data processing operations of the non-volatile memory devices 62000A, 62000B and 62000C.

The electronic device 60000 may be implemented as a memory system or a memory module.

Each of the non-volatile memory devices 62000A, 62000B and 62000C may be the same as each of the non-volatile memory devices shown in FIGS. 1 and 7. The non-volatile memory devices 62000A, 62000B and 62000C may store random data.

According to embodiments, the memory controller 61000 may be implemented internal or external the electronic device 60000. The memory controller 61000 may include a first interface and a microprocessor. The first interface receives from a host a first command, a first address corresponding to the first command, a second address, an address state separation command for separating the first and second addresses from each other, and a second command corresponding to the second address. The microprocessor decodes the first command, maps the first address, controls the decoded first command to be performed in each of the non-volatile memory devices 62000A, 62000B and 62000C using the mapped first address, and determines a relation between the first address and the second address by referring to the address state separation command. The relation between the first address and the second address is used to determine whether the first command and the second command are to be concurrently performed in the first and second addresses.

Figure 13:
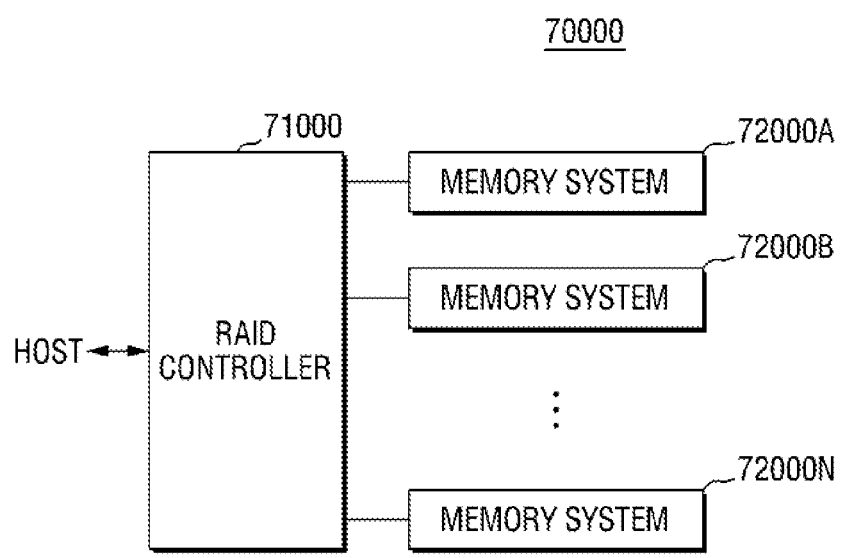
FIG. 13 is a block diagram of a data processing system including the electronic device shown in FIG. 12.

FIG. 13 is a block diagram of a data processing system (70000) including the electronic device (60000) shown in FIG. 12.

Referring to FIGS. 12 and 13, the data processing system 70000 implemented as a redundant array of independent disks (RAID) system may include a RAID controller 71000 and a plurality of memory systems 72000A, 72000B, . . . and 72000N, where N is a natural number.

Each of the plurality of memory systems 72000A, 72000B, . . . and 72000N may be the same as the electronic device 60000 shown in FIG. 12. The plurality of memory systems 72000A, 72000B, . . . and 72000N may form an RAID array. The data processing system 70000 may be implemented as a personal computer (PC) or a solid state disk (SSD).

During a program operation, the RAID controller 71000 may output program data output from a host to one of the plurality of memory systems 72000A, 72000B, . . . and 72000N according to one of a plurality of RAID levels based on the RAID level information output from the host.

During a read operation, the RAID controller 71000 may transmit read data output from one of the plurality of memory systems 72000A, 72000B, . . . and 72000N to a host according to one of a plurality of RAID levels based on the RAID level information output from the host.

A memory controller of each of the plurality of memory systems 72000A, 72000B, . . . and 72000N may be the same as each of the memory controllers 1120 and 2100 shown in FIGS. 1 and 2. The memory controller may include a first interface and a microprocessor. The first interface receives from a host a first command, a first address corresponding to the first command, a second address, an address state separation command for separating the first and second addresses from each other, and a second command corresponding to the second address. The microprocessor decodes the first command, maps the first address, controls the decoded first command to be performed in the non-volatile memory device 16000 using the mapped first address, and determines a relation between the first address and the second address by referring to the address state separation command. The relation between the first address and the second address is used to determine whether the first command and the second command are to be concurrently performed in the first address and the second address.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims. It is therefore desired that the present embodiments be considered in all respects as illustrative and not restrictive, reference being made to the appended claims rather than the foregoing description to indicate the scope of the inventive concept.

What is claimed is:

1. A memory controller comprising:
an interface configured to receive a first command, a first address, an address state separation command, and a second address, the first address corresponding to the first command, and the address state separation command separating the first and second addresses from each other in a communication received by the interface; and
a microprocessor configured to decode the first command, map the first address to a non-volatile memory device, map the second address to the non-volatile memory device, execute the first command relative to the first address mapped to the non-volatile memory device, and determine a relation between the first address and the second address identified by the address state separation command, wherein
the microprocessor is further configured to selectively execute a second command relative to the second address mapped to the non-volatile memory device concurrently with the first command based on the relation between the first address and the second address identified by the address state separation command.

2. The memory controller of claim 1, wherein the interface is a host interface communicating with a host device.

3. The memory controller of claim 1, wherein the first command is a read command or an erase command.

4. The memory controller of claim 1, wherein the first command is a program command and the interface sequentially receives the first command, the second address and first data to be programmed according to the first command.

5. The memory controller of claim 4, wherein when the first command is performed, information concerning the second address is programmed in a metadata region of the first address.

6. The memory controller of claim 1, wherein the address state separation command is interposed between the first address and the second address in the communication received by the interface.

7. The memory controller of claim 1, wherein the interface receives the second command and then receives a third address.

8. The memory controller of claim 7, wherein the third address is consecutively provided after the second address and does not correspond to the first command or the second command.

9. The memory controller of claim 1, wherein the memory controller further comprises a memory interface providing the decoded first command and the mapped first address to the non-volatile memory device.

10. A memory controller comprising:
a host interface configured to receive in order a first command, a first address associated with the first command, a separation command, a second address, and a second command associated with the second address, wherein the separation command separates the first and second addresses from each other in a communication received by the host interface;
a memory interface configured to interface with a non-volatile memory; and
a microprocessor configured to decode the first command, map the first address to the non-volatile memory, extract the first and second addresses based on the separation command, and determine a relationship between the first and second addresses identified by the separation command,
wherein the relationship is indicative of whether the first and second commands can be concurrently executed, and
wherein the microprocessor is further configured to concurrently execute the first and second commands when the relationship identified by the separation command indicates that the first and second commands can be concurrently executed, and to non-concurrently execute the first and second commands when the relationship identified by the separation command does not indicate that the first and second commands can be concurrently executed.

11. The memory controller of claim 10,
wherein the first and second commands are program commands, and
wherein the host interface is configured to receive first program data of the first command between receiving the second address and the second command.

12. The memory controller of claim 11, wherein the host interface is configured to receive second program data of the second command after receiving the second command.

13. An electronic device comprising a host, and a memory controller communicating with the host and controlling one or more non-volatile memory devices, wherein the memory controller comprises:
a host interface coupled to the host and configured to receive a first command, a first address, a second address, and an address state separation command for separating the first and second addresses from each other in a communication received by the host interface;
a microprocessor configured to decode the first command, map the first address to the one or more non-volatile memory devices, and determine a relation between the first address and the second address identified by the address state separation command; and
a memory interface providing the decoded first command and the mapped first address to the one or more non-volatile memory devices.

14. The electronic device of claim 13, wherein the host interface is further configured to receive a second command corresponding to the second address and a third address that is an address consecutively provided after the second address.

15. The electronic device of claim 13, wherein the address state separation command is interposed between the first address and the second address in the communication received by the host interface.

16. The electronic device of claim 13, wherein the first command is a program command.

17. The electronic device of claim 16, wherein after the second address is provided, data corresponding to the first command is provided.

18. The electronic device of claim 17, wherein when a program operation is performed, information concerning the second address is programmed in a metadata region by performing the first command.

19. The electronic device of claim 13, wherein the first command is an erase command or a read command.

20. A method for operating a memory controller, the method comprising:
receiving from a host a first program command, a first address, a second address, and an address state separation command that is interposed between the first and second addresses and separates the first and second addresses from each other in a communication received from the host;
receiving the second address and data corresponding to the first program command in that order;
controlling a non-volatile memory device to perform the first program command in the first address; and
receiving a second program command corresponding to the second address and a third address and controlling the non-volatile memory device to perform the second program command in the second address.

21. The method of claim 20, further comprising decoding the first program command and mapping the first address to the non-volatile memory device.

22. A memory controller comprising:
an interface receiving a first command, a first address and a second address, an address state separation command that is interposed between the first and second addresses and separates the first and second addresses from each other in a communication received by the interface, and then receiving a second command and a third address from a host; and
a microprocessor performing a first operation using the first command and the first address and performing a second operation using the second command and the second address.

23. The memory controller of claim 22, wherein the interface further receives the second address between the second command and the third address.

24. The memory controller of claim 22, wherein after receiving the second command and the third address, the interface receives a third command and a fourth address, and the microprocessor performs a third operation using the third command and the third address.

25. The memory controller of claim 22, wherein the first command is a program command, and the interface further receives first data after receiving the second address and before receiving the second command.

26. The memory controller of claim 22, wherein the first command is an erase command or a read command.

27. The memory controller of claim 22, wherein the interface is a host interface.

28. The memory controller of claim 22, further comprising a random access memory (RAM) coupled to the interface and temporarily storing the second address and the third address.

29. The memory controller of claim 1, wherein the microprocessor programs the second address in a metadata region of the first address when the first command is performed.

30. The memory controller of claim 22, wherein the microprocessor is further configured to concurrently execute the first command and a second command when the address state separation command indicates that the first and second commands are to be concurrently executed, and to non-concurrently execute the first and second commands when the address state separation command does not indicate that the first and second commands are to be concurrently executed.

* * * * *